United States Patent [19]
Yamanaka

[11] 3,823,399
[45] July 9, 1974

[54] METHOD AND APPARATUS FOR MEASURING DISTANCE TO TARGET USING FREQUENCY-MODULATED CONTINUOUS WAVES

[76] Inventor: Teruo Yamanaka, 69-1, Yagotaurayama, Tenpaku-cho, Showa-ku, Nagoya-shi, Aichi-ken, Japan

[22] Filed: Aug. 29, 1972

[21] Appl. No.: 284,680

[30] Foreign Application Priority Data
Sept. 2, 1971 Japan.............................. 46-67763

[52] U.S. Cl. ............................................... 343/14
[51] Int. Cl. ............................................... G01s 9/23
[58] Field of Search ...................................... 343/14

[56] References Cited
UNITED STATES PATENTS
3,182,323  5/1965  Nilssen..................... 343/14
3,214,756  10/1965  Goldberg................... 343/14

*Primary Examiner*—Samuel Feinberg

[57] ABSTRACT

An improvement of a method for measuring distance to target using transmitted and reflected frequency-modulated continuous waves is provided. A low frequency wave produced by mixing a transmitted wave and a wave reflected from the target is separated into frequency components such as a Doppler signal component, a fundamental wave component and its harmonic components. Then, Doppler signals are obtained from the fundamental wave and harmonic components. The ratio in intensity between at least two Doppler signals is calculated to measure the distance to the target. Since the phase of Doppler signal is reversed depending upon whether the target is moving toward or away from the distance measuring apparatus, the direction of the relative movement between the target and the apparatus may be detected. Furthermore, the relative speed between the target and the distance measuring apparatus may be detected from the frequency of each Doppler signal. When the ratio of the distance to the target to the relative speed reaches a predetermined value, a command signal to actuate a device is produced.

21 Claims, 19 Drawing Figures

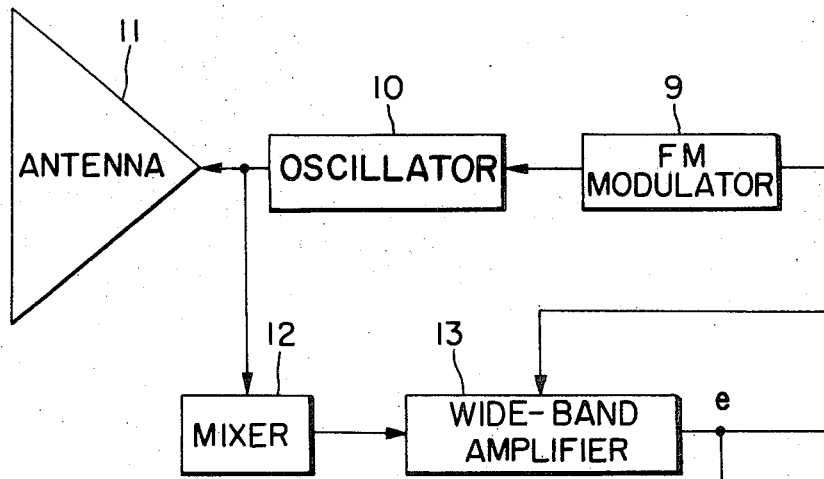

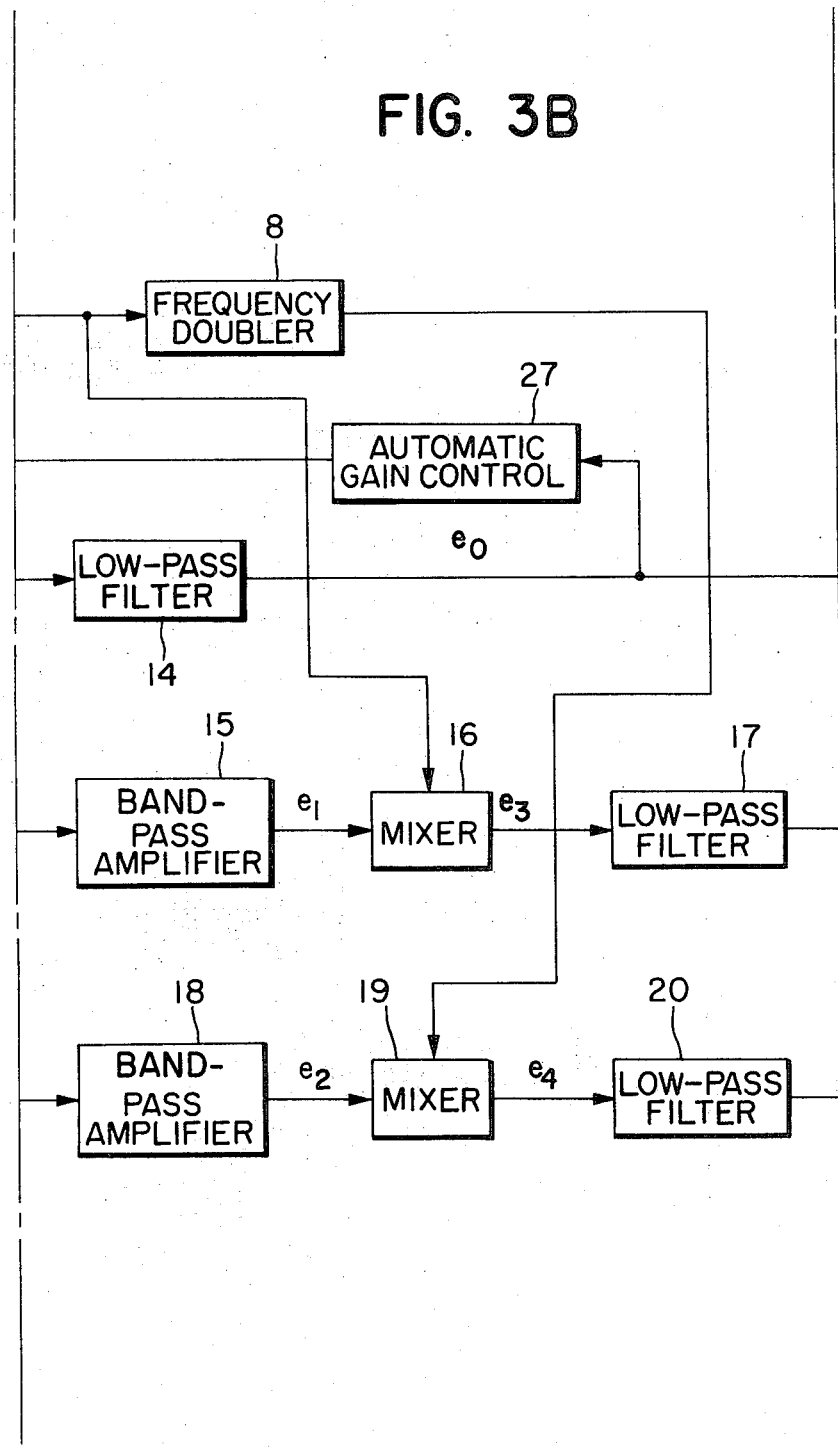

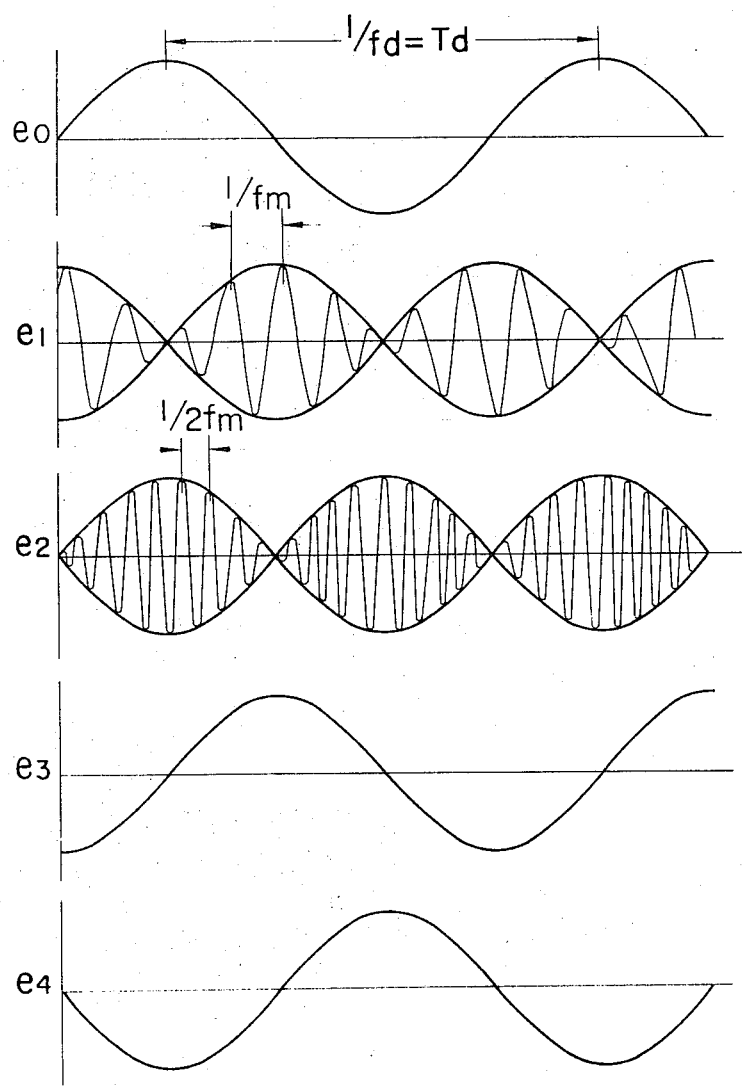

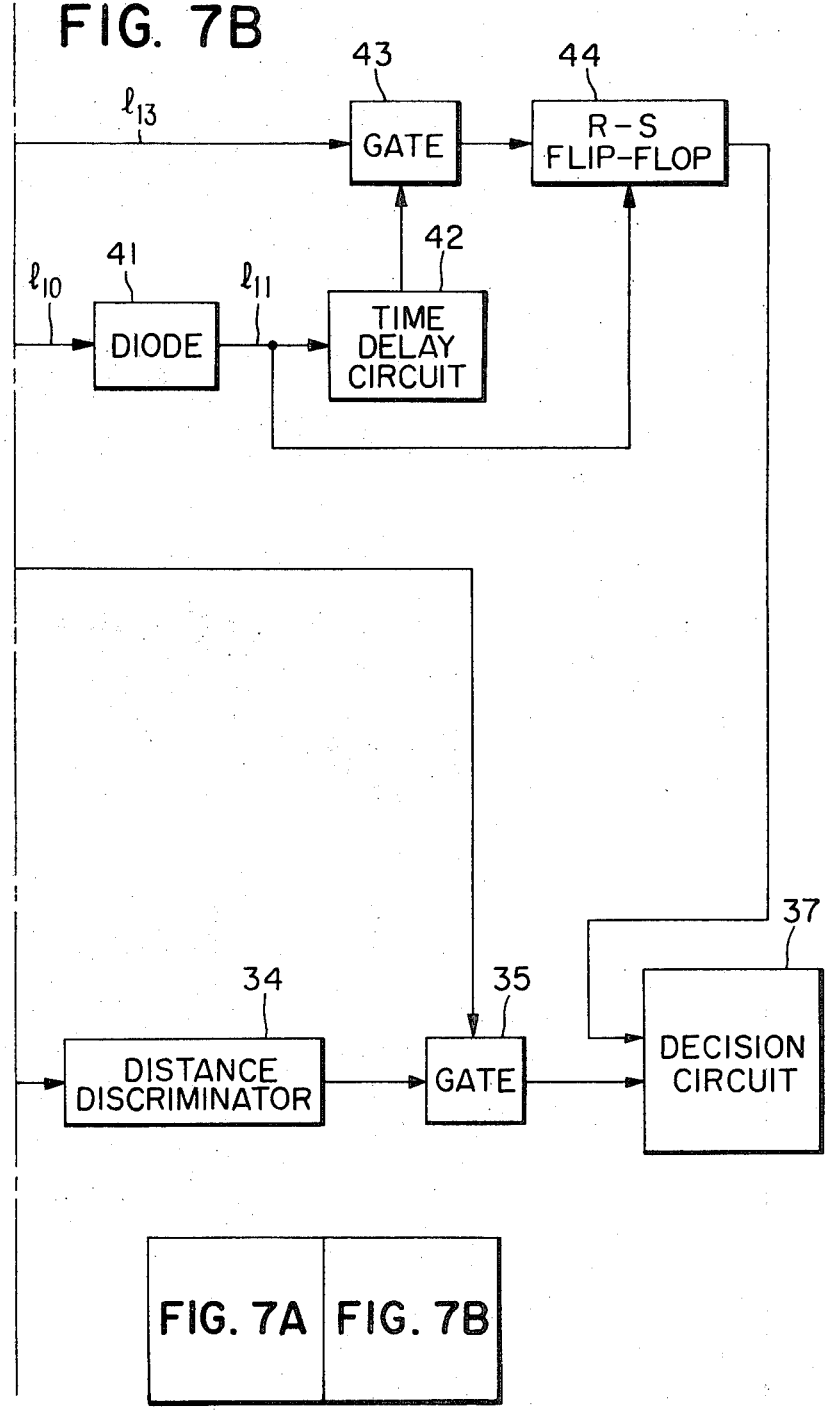

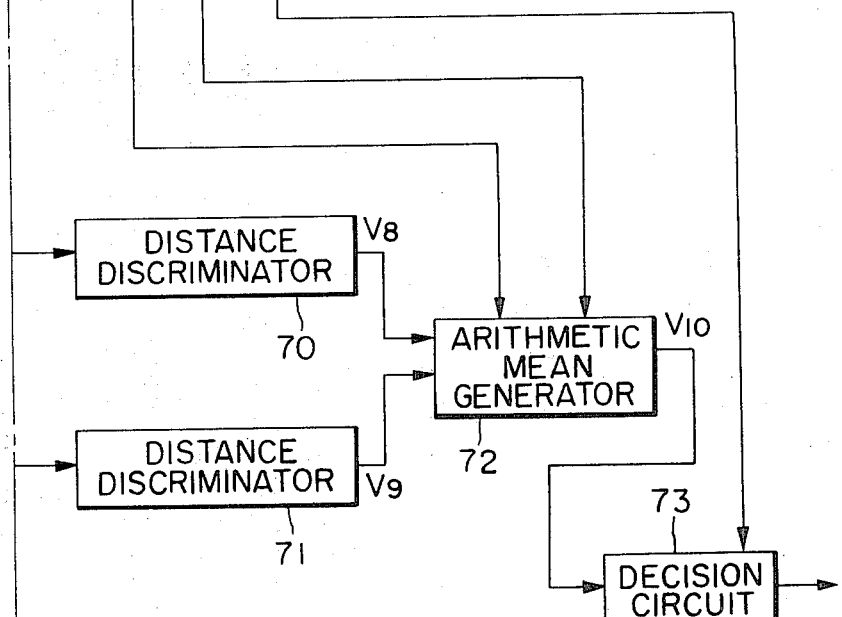

METHOD AND APPARATUS FOR MEASURING DISTANCE TO TARGET USING FREQUENCY-MODULATED CONTINUOUS WAVES

BACKGROUND OF THE INVENTION

The present invention relates to a method and apparatus for measuring a distance by utilizing the frequency-modulated continuous waves.

The apparatus mounted on vehicles for detecting obstacles and preventing collision is required to measure a distance of the order less than a few hundred meters. In the prior art system, the frequency of the frequency-modulated wave transmitted and reflected back from a target is compared with that of a wave from an oscillator radiation at the same time when the reflected wave is received in order to derive the signal representing the distance to the target. This system will be referred to as "the prior art system" hereinafter in this specification. The prior art system inherently has a fixed error $\Delta R$ in measuring the distance, and this error becomes the minimum measurable distance, which is given by:

$$\Delta R = C/8 \, \Delta f$$

where $C$ = velocity of radiation wave; and $\Delta f$ = frequency deviation.

For example, when $\Delta f = 10^7 Hz$, $\Delta R$ becomes 4 meters, which is a great error in measuring the distance of less than a few hundred meters. Furthermore, it is often required to measure a distance between 1 and 3 meters, so that in the prior art system the frequency deviation must be increased, thus presenting various technical problems.

SUMMARY OF THE INVENTION

The present invention is similar to the prior art distance measuring apparatus using frequency-modulated continuous waves in that the frequency-molulated continuous waves transmitted are mixed with a wave reflected from a target in order to produce a low frequency wave, but the present invention is different from the prior art apparatus in that the low frequency waves produced are separated into frequency components such as a Doppler signal component, a fundamental wave component and harmonic components; fundamental wave and harmonic components are than mixed with some high frequency waves and filtered through low-pass filters respectively to obtain Doppler signals, and the ratio in intensity between at least two Doppler signals is calculated to measure the distance to a target.

Whether the target is moving toward or away from a distance measuring apparatus is detected by the phase of the Doppler signal.

The relative speed between the target and the distance measuring apparatus may be detected by the frequency of each of said Doppler signals. When the ratio between the distance to the target and the relative speed reaches a predetermined value, a command signal for actuating a device is produced.

One of the objects of the present invention is to provide a method and apparatus for measuring a distance to a target using frequency-modulated continuous waves with a higher degree of accuracy even when the target is very close to the apparatus.

Another object of the present invention is to provide a distance measuring apparatus capable of detecting not only the relative speed between the target and the apparatus but also whether the target is moving toward or away from the apparatus.

Another object of the present invention is to measure with a higher degree of accuracy a time required for the target to collide with the vehicle or the like equipped with the distance measuring apparatus from the detected distance to the target and the relative speed.

The above and other objects, features and advantages of the present invention will become more apparent from the following description of some preferred embodiments thereof taken in conjunction with the accompanying drawings.

BRIEF DESCRIPTION OF THE DRAWINGS

FIG. 3A to FIG. 3C show a block diagran of a first embodiment of the present invention;

FIG. 4 illustrates waveforms at various points in the block diagram of FIG. 3A to FIG. 3C;

FIG. 7A and FIG. 7B show a block diagram of a second embodiment of the present invention;

FIG. 9A to FIG. 9D show a block diagram of a third embodiment of the present invention.

DETAILED DESCRIPTION OF THE INVENTION

Figure 1:
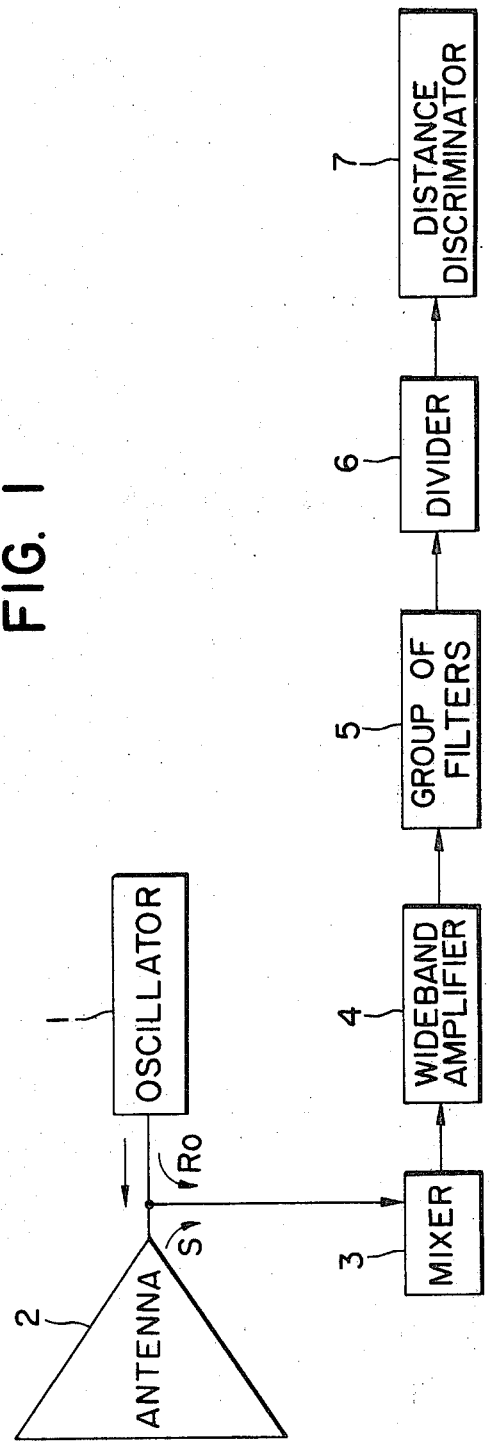
FIG. 1 is a block diagram used for explanation of the underlying principle of the present invention.

Referring to FIG. 1, the underlying principle of the present invention will be described by way of example in which the sinusoidal wave is used for frequency modulation. The reference signal R0 directly received from an oscillator 1 and the reflected signal or echo S received from an antenna 2 are mixed in a mixer 3 so that a signal consisting of low frequency components or beat note may be derived. In this case, the derived AC signal voltage $e$ is given by:

$$e = r \cos \left\{ \omega_o \Delta t + 2m_f \sin \frac{\omega_m \Delta t}{2} \cos \left( \omega_m t + \frac{\omega_m \Delta t}{2} \right) \right\}$$

$$= r \cos \omega_c \Delta t \left\{ J_0(m_r) + 2 \sum_{n=1}^{\infty} (-1)^n \cos 2n \left( \omega_m t + \frac{\omega_m \Delta t}{2} \right) \cdot J_{2n}(m_r) \right\} - r \sin \omega_o \Delta t 2 \left[ \sum_{n=0}^{\infty} (-1^n) \cos \left\{ (2n+1) \cdot \left( \omega_m t + \frac{\omega_m \Delta t}{2} \right) \right\} J_{2n+1}(m_r) \right] \quad (1)$$

where $r$ = coefficient depending upon the reflection factor of a target, characteristics of the mixer and the like;

$\omega_c$ = angular frequency of the carrier;

$\Delta t$ = time interval between the time the signal is transmitted and the time the signal reflected back from the target is received;

$\omega_m$ = angular frequency of modulated wave;

$J_{2n}$ = Bessel Function of order 2n of the First Kind; and $m_f$ = modulation index; $2\pi\Delta f/\omega_m$ and $$m_r = 2m_f \sin \omega_m \Delta t/2 \qquad (2)$$

When the distance to the target is R, $$\Delta t = 2R/C \qquad (3)$$

where C = velocity of radiation wave.

The AC signal voltage e given by Eq. (1) is amplified by a wide-band or broadly tuned amplifier 4 and filtered by a group of filters 5 into the frequency components such as $rJ_0 (m_r) \cos \omega_c \Delta t$, $-2rJ_1 (m_r) \cos (\omega_m t + \omega_m \Delta t/2) \sin \omega_c \Delta t$, $-2rJ_2 (m_r) \cos (\omega_m t + \omega_m \Delta t) \cos \omega_c \Delta t$,

...

It should be noted that the component $rJ_0 (m_r) \cos \omega_c \Delta t$ becomes the DC component when the target is not moving relative to the distance measuring apparatus.

When the target is not moving with respect to the distance measuring apparatus, the maximum values of the fundamental wave and the harmonics are $2rJ_1 (m_r) \sin \omega_c \Delta t$, $2rJ_2 (m_r) \cos \omega_c \Delta t$, $2rJ_3 (m_r) \sin \omega_c \Delta t$ and so on. The ratios between the maximum values of the frequency components are calculated by a divider 6. The ratios between the maximum values of the frequency components such as $J_3 (m_r)/J_1 (m_r)$, $J_4 (m_r)/J_2 (m_r)$ and so on may be uniquely determined when $m_r$ is determined. In other words, $m_r$ may be uniquely determined from the ratios of the maximum values of the frequency components. When $\Delta f$ and $\omega_m$ are given, $m_r$ is only the function of $\Delta t$, that is, the distance R to the target as shown in Eqs. (2) and (3). Thus, it becomes possible to measure the distance R from $m_r$. A distance discriminator 7 converts the ratio of the maximum values of the frequency components into the output signal in proportion to the distance R.

When the target is moving toward or away from the distance measuring apparatus at a relative velocity u, the relation between the Doppler angular frequency $\omega_d = u/C\omega_c$ and the FM angular frequency $\omega_m$ is so selected as to satisfy the following condition:

$$\omega_m >> \omega_d$$

Therefore, the maximum values of the frequency components such as a Doppler signal component, a fundamental wave component and harmonic components filtered by the group of fiters 5 are $rJ_0 (m_r)$, $2rJ_1 (m_r)$, $2rJ_2 (m_r)$, and so on. Thus it is also possible to measure the distance R from the ratios of the maximum values of any two of the frequency components as in the case of the target that is stationary with respect to the distance measuring apparatus.

Figure 2:
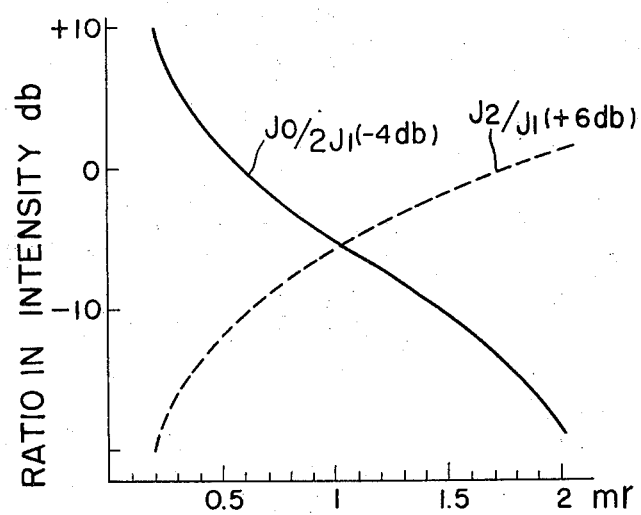
FIG. 2 is a graph illustrating the relation between the distance to a target and the ratios in intensity between frequency components of the output of a mixer.

The ratios of the maximum values of the frequency components $J_0 (m_r)/2J_1 (m_r)$ and $J_2 (m_r)/J_1 (m_r)$ are shown in FIG. 2 in which $M_r$ is plotted along the abscissa and the ratios in intensity in db along the ordinate. It should be noted that for simplicity the ratio $J_0/2J_1$ obtained by subtracting 4 db from the actual ratio is shown in FIG. 2. In like manner, the ratio $J_2/J_1$ shows the actual ratio plus 6 db.

So far the underlying principle of the present invention has been described with the sine wave, but it should be understood that any waveform similar to the sine wave may be used in the present invention.

Also, the principle of the present invention has been described with reference to measuring the distance to the target by calculating the ratio between the maximum amplitudes of the Doppler signals. But in the present invention, the ratio in intensity may be calculated by averaging the Doppler signals on time, for example, converting the Doppler signals to the DC signals. Also, the distance to the target may be measured by calculating the ratio in intensity between amplitudes of at least two Doppler signals of the same phase or anti-phase.

FIRST EMBODIMENT, FIGS. 3, 4, 5 and 6

One embodiment of a distance measuring method and apparatus in accordance with the present invention will be described in detail with reference to FIG. 3. The sine wave is used for frequency modulation, and the target is moving relative to the distance measuring apparatus. The apparatus comprises a frequency doubler 8 to be described in more detail hereinafter; an FM modulator 9; an oscillator 10; an antenna 11 for propagating the signal and receiving the echo reflected back from the target; a mixer 12 for mixing the reflected signal received from the antenna 11 and a part of the transmitted signal so as to derive a low frequency signal or beat note; a wide-band amplifier 13 for amplifying the output of the mixer 12 without causing the distortion; a low-pass filter 14 for passing only the Doppler signal; a band-pass amplifier 15 for amplifying only the suppressed carrier AM signal in which the fundamental wave of the FM wave is the carrier and the Doppler signal is the modulating signal; a mixer 16 for mixing the output of the amplifier 15 and the fundamental wave of the FM wave so as to derive the superposed signal of the Doppler shift signal and a wave with a frequency not lower than the fundamental FM frequency; a low-pass filter 17 for passing only the Doppler signal component out of the output signal of the mixer 16; a band-pass amplifier 18 for amplifying only the suppressed carrier AM signal in which the carrier has the frequency two times the FM frequency and the Doppler signal is the modulating signal; a mixer 19 for mixing the outputs of the amplifier 18 and the frequency doubler 8 so as to derive the superposed signal of the Doppler signal and a wave with a frequency not lower than the double FM frequency; a low-pass filter 20 for passing only the Doppler signal component out of the output of the mixer 19; a divider 21 for obtaining the ratio in intensity between the Doppler signals from the low-pass filters 14 and 17; a distance discriminator 22 for deriving the output in proportion to the distance to the target from the output of the divider 21; a divider 23 for obtaining the ratio in intensity between the Doppler signal outputs from the low-pass filters 17 and 20; a distance discriminator 24 for deriving from the output of the divider 23 the output proportional to the distance to the target; an arithmetic mean generator 25 for generating an arithmetic mean of the outputs of the distance discriminators 22 and 24; a display device or meter 26 for displaying the distance to the target; and an automatic gain controller 27 for automatically controlling the gain of the amplifier 13.

The distance discriminators 22 and 24 are so arranged that when the signals in proportion to the ratios in intensity between Doppler signals are applied to the inputs of the discriminators, the outputs representing $m_r$ and hence the distance to the target may be derived as shown in FIG. 2.

The modulator 9 is connected to the modulation input terminal of the oscillator 10 which in some cases has no modulation input terminal and to the input terminal of the frequency doubler 8. The output terminal of the oscillator 10 is connected to the antenna 11 and to the input terminal of the mixer 12 for feeding thereto a part of the signal transmitted. The antenna 11 is connected to the output terminal of the oscillator 10 and to the input terminal of the mixer 12 for feeding the received echo thereto. The output terminal of the mixer 12 is connected to the input terminal of the amplifier 13 whose output terminal is connected to the input terminals of the low-pass filter 14, and the amplifiers 15 and 18. The output terminal of the low-pass filter 14 is connected to one of the input terminals of the divider 21 and to the input terminal of the automatic gain controller 27. The output terminal of the amplifier 15 is connected to one input terminal of the mixer 16 whose another input terminal is connected to the output terminal of the modulator 9. The output terminal of the mixer 16 is connected to the input terminal of the low-pass filter 17 whose output terminal is connected to the other input terminal of the divider 21 and one of the input terminals of the divider 23. The output terminal of the amplifier 18 is connected to one of the input terminals of the mixer 19 whose the other input terminal is connected to the output terminal of the frequency doubler 8. The output terminal of the mixer 19 is connected to the input terminal of the low-pass filter 20 whose output terminal is connected to the other input terminal of the divider 23. The output terminals of the dividers 21 and 23 are connected to the input terminals of the distance discriminators 22 and 24 respectively, whose output terminals are connected to the input terminals of the arithmetic mean generator 25, whose output terminal is connected to the input terminal of the display device 26. The output terminal of the automatic gain controller 27 is connected to the gain control terminal of the amplifier 13.

Figure 5:
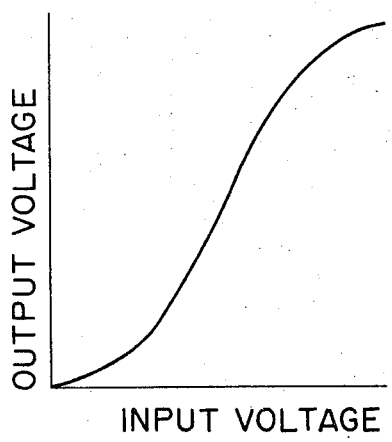
FIGS. 5 and 6 illustrate the characteristic curves of the two distance discriminators, respectively.
Figure 6:
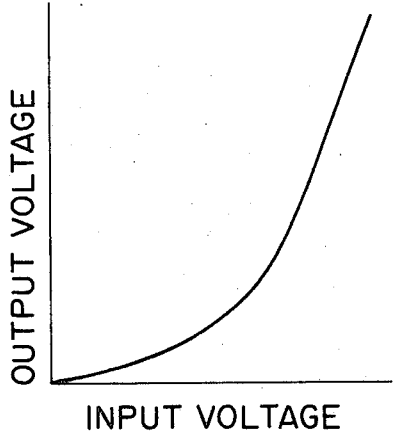

Next the general mode of operation of the distance measuring apparatus with the above construction will be described. The FM signal from the FM modulator 9 is transmitted from the antenna 11 toward the target, and the signal or echo reflected back from the target is received by the same antenna 11. In the instant embodiment, the antenna 11 is used for both transmission and reception. The received signal is fed into the mixer 12 where it is mixed with the signal from the oscillator 10. The output of the mixer 12 is amplified by the wide-band amplifier 13, the output of which is given by Eq. (1). That is, the output of the amplifier 13 consists of a Doppler signal component, a fundamental wave component and the harmonic components which are superposed one upon another. The output of the amplifier 13 is fed into the low-pass filter 14 which may be a band-pass filter, a tuned amplifier or low-pass amplifier. The cutoff frequency of the low-pass filter 14 is so selected that the output of the low-pass filter 14 consists of only the Doppler signal $e_0$ as shown in FIG. 4. The amplifier 15 which may be, in combination, a band-pass filter and an amplifier, only a band-pass filter, a low-pass filter and a high-pass filter, a tuned amplifier or the like passes and amplifies only the FM signal whose carrier is the fundamental wave of the FM wave. The waveform of the output $e_1$ of the amplifier 15 is shown in FIG. 4. The mixer 16 mixes the outputs of the amplifier 15 and the modulator 9, and the output of the mixer 16 is fed into the low-pass filter 17 so that the Doppler signal $e_3$ as shown in FIG. 4 is derived. That is, the output of the low-pass filter 17 consists only of the Doppler signal as in the case of the output of the low-pass filter 14. In like manner, the output $e_2$ as shown in FIG. 4 is derived from the amplifier 18, and the output $e_4$ as shown in FIG. 4 is derived from the low-pass filter 20. It should be noted that the maximum amplitudes of the output signals from the low-pass filters 14, 17 and 20 are in proportion to $rJ_0\ (m_r)$, $2rJ_1\ (m_r)$ and $2rJ_2\ (m_r)$ respectively, shown in Eq. (1). The divider 21 calculates $2rJ_1\ (m_r)/rJ_0\ (m_r)$ whereas the divider 23 $rJ_2\ (m_r)/rJ_1\ (m_r)$. As described hereinbefore with reference to FIG. 2, $m_r$ is uniquely determined from the ratios. The distance discriminators 22 and 24 are so arranged that when the output voltages or currents of the dividers 21 and 23 are fed into the discriminators 22 and 24, the output voltages or currents in proportion to $m_r$ and hence the distance may be derived as shown in FIGS. 5 and 6. That is, the output voltages of the distance discriminators 22 and 24 represent the distance to the target. The output signals from the distance discriminators 22 and 24 are fed into the arithmetic mean generator 25 so that the output of the latter represents the arithmetic mean of the distance to the target. The output of the arithmetic mean generator 25 is fed to the display device or meter 26 which displays the distance to the target. The automatic gain controller 27 is a sort of an automatic gain control circuit so that the amplification factor, which is in general an apparent amplification factor, of the amplifier is decreased when the maximum amplitudes of the output signal from the low-pass filter 14 is greater than a reference level or voltage whereas the amplification factor is increased when the output signal is lower than the reference level. The automatic gain controller 27 therefore serves to improve the reliability in operation and the accuracy of the distance measuring apparatus by maintaining constant the output of the low-pass filters 14, 17 and 20 respectively, when the intensity of the reflected signal or echo varies greatly depending upon the distance to and the position of a target.

In the first embodiment, the maximum amplitudes of the Doppler signals are obtained and the ratios therebetween are calculated by means of dividers 21, 23, as an example of calculating the ratio in intensity on a time average. The maximum amplitudes may be obtained by a peak hold circuit and the ratios therebetween may be calculated, as another example of calculating the ratio in intensity on a time average.

Figure 7A:
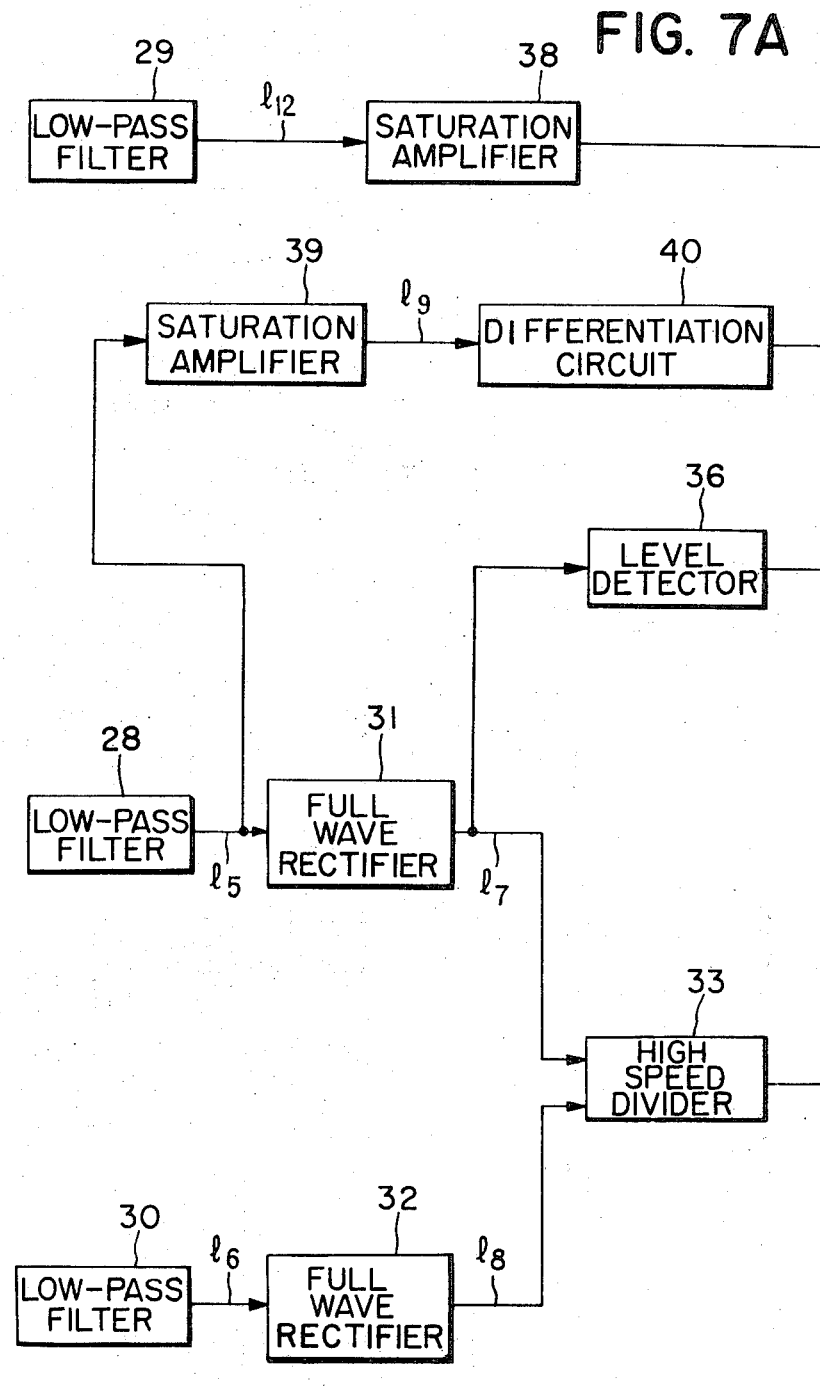
Figure 8:
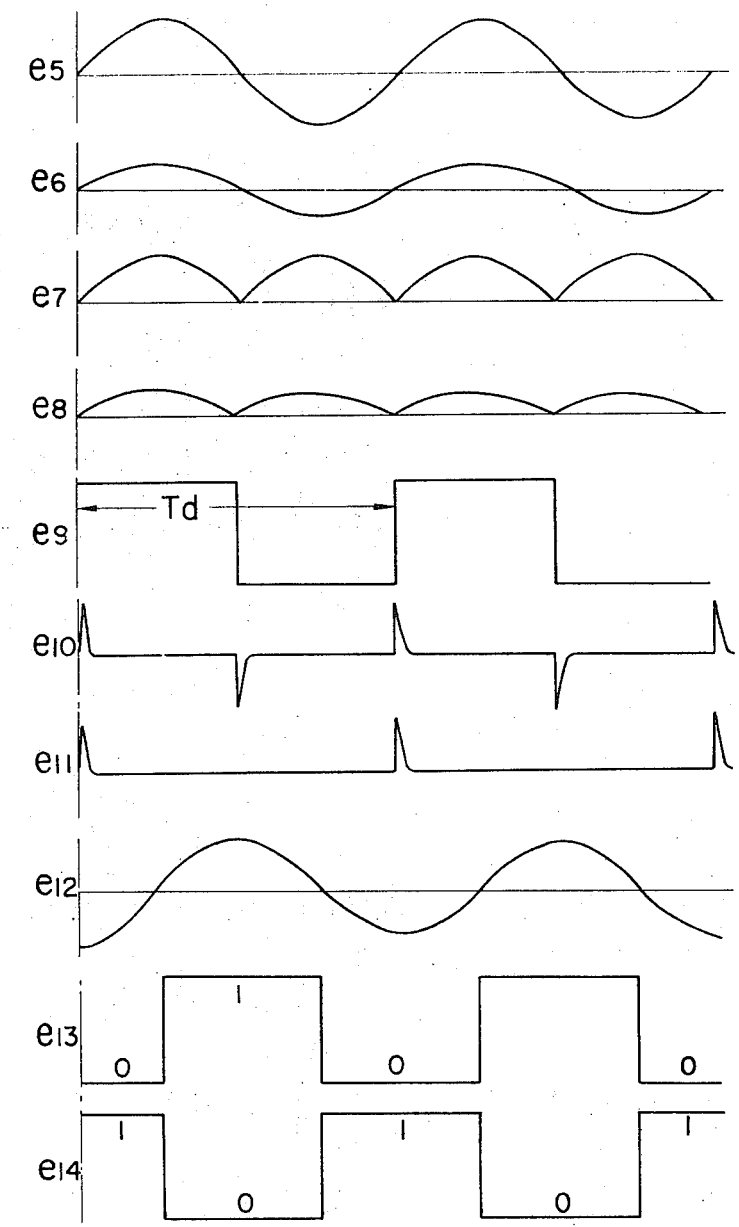
FIG. 8 illustrates waveforms of the outputs of various blocks shown in FIG. 7A and FIG. 7B.

SECOND EMBODIMENT, FIGS. 7 and 8

Next referring to FIGS. 7 and 8, the second embodiment will be described in which the present invention is applied to the instantaneous comparison system, and a circuit for detecting whether a target is moving toward or away from the distance measuring apparatus.

The features of the second embodiment reside in the fact that the response can be remarkably improved and also the fact that it is possible to detect whether the target is moving toward or away from the distance measuring apparatus. The second embodiment is different from the first embodiment described with reference to FIG. 3 in the stages following the dividers 21 and 23 in FIG. 3, so that only the stages different from the first embodiment are shown in FIG. 7 and will be described in detail hereinafter.

Low-pass filters 28, 29 and 30 are similar in construction and operation to the low-pass filters 14, 17, and 20 of the first embodiment described with reference to FIG. 3. The output terminal of the low-pass filter 28 is connected to the input terminal of a full-wave rectifier 31 which is the circuit for deriving the absolute value of the signal voltage and to the input terminal of a saturation amplifier (a set of nonlinear amplifier) 39. The output of the low-pass filter 30 is connected to the input terminal of a full-wave rectifier 32. When the input signals to the full-wave rectifiers 31 and 32 are negative, the absolute magnitudes of the input signals remain unchanged, but the signs are reversed to positive. The output terminals of the full-wave rectifiers 31 and 32 are connected to the input terminals of a high-speed divider 33 which derives the ratio between the outputs of the full-wave rectifier 31 and 32. The output terminal of the high-speed divider 33 is connected to the input terminal of a distance discriminator 34 which is similar in construction and operation to the distance discriminator 23 of the first embodiment described with reference to FIG. 3. That is, the distance discriminator derives the output signal representing the distance to the target from the output of the high-speed divider 33. The output terminal of the distances discriminator 34 is coupled to the input terminal of a gate circuit 35 to the control terminal of which is connected to the output terminal of a level detector 36, whose input terminal in turn is connected to the output terminal of the full-wave rectifier 31. The gate circuit 35 is adapted to pass the signal only when the level of the output signal of the level detector 36 is in excess of a predetermined level. The output terminal of the gate circuit 35 is connected to one of the input terminals of a decision circuit 37.

The output terminal of the saturation amplifier 39 is coupled to the input terminal of a differentiation circuit 40 whose output terminal in turn is connected to an input terminal of a diode 41. The output terminal of the diode 41 is connected to the input terminal of a time delay circuit 42 which is adapted to delay the signal, and to the reset terminal of a RS (set-reset) flip-flop 44.

The output terminal of the low-pass filter 29 is connected to the input terminal of a saturation amplifier 38 whose output terminal in turn is connected to an input terminal of a gate circuit 43 whose control terminal is connected to the output terminal of the time delay circuit 42. When the level of the output signal from the time delay circuit 42 is in excess of a predetermined level, the gate circuit 43 is opened to pass the signal to the set input terminal of the RS flip-flop 44, whose output terminal is connected to another input terminal of the decision circuit 37.

In this instantaneous comparison system, the ratio is calculated by detecting amplitudes of at least two Doppler signals of the same phase, as is different from the system of the first embodiment in which the ratio is calculated on a time average.

Next the mode of operation will be described when the target is moving toward or away from the distance measuring apparatus. The output signal $e_5$ of the low-pass filter 28 is $rJ_0(m_r) \cos \omega_c \Delta t$ as shown in Eq. (1), and as shown in FIG. 8. The output signal $e_6$ of the low-pass filter 30 is $-2rJ_2(m_r) \cos \omega_c \Delta t$ as shown in Eq. (1) and in FIG. 8. Since the negative going signals are reversed in polarity by the full-wave rectifiers 31 and 32, the output signal waveforms $e_7$ and $e_8$ as shown in FIG. 8 are derived from the full-wave rectifiers 31 and 32. The high-speed divider 33 calculates the ratio between the outputs of the full-wave rectifiers 31 and 32. The output of the high-speed divider is in proportion to $rJ_0(m_r) \cos \omega_c \Delta t / 2rJ_2(m_r) \cos \omega_c \Delta t = J_0(m_r)/2J_2(m_r)$. In a manner substantially similar to that described in the first embodiment, the distance discriminator 34 derives the output signal representative of the distance to the target.

In the level detector 36, the output of the full-wave rectifier 31, that is $rJ_0(m_r) |\cos \omega_c \Delta t|$ is compared with a reference level. When the output is in excess of the reference level, the level detector 36 outputs the output signal to the gate circuit 35. Therefore, the gate circuit 35 passes the output signal of the distance discriminator 34 to the decision circuit 37 only when the output signal of the level detector 36 is fed to the gate circuit 35, that is the output level of the full-wave rectifier 31 is in excess of the reference level. Therefore, the error caused in the high speed divider 33 when the level of the output signal $rJ_0(m_r) |\cos \omega_c \Delta t|$ is close to zero may be eliminated. Thus, the distance to the target can be measured.

Next the mode of detecting whether the target is moving toward or away from the distance measuring apparatus will be described. The output $e_{12}$ of the low-pass filter 29 is $-2rJ_1(m_r) \sin \omega_c \Delta t$ as shown in Eq. (1) and in FIG. 8. The sine wave input signal is shaped into the rectangular waveform $e_{13}$ by the saturation amplifier 38 as shown in FIG. 8. When the target is moving in the opposite direction, the waveform $e_{14}$ 180° out of phase is derived as shown in FIG. 8. The sine wave input signal of the low-pass filter 28 is also shaped into the rectangular waveform $e_9$ by the saturation amplifier 39 as shown in FIG. 8, and the output of the saturation amplifier 39 is differentiated by the differentiation circuit 40 so that the alternatively positive and negative going pulses $e_{10}$ as shown in FIG. 8 are derived. The diode 41 serves to pass only the positive pulses so that the output $e_{11}$ of the diode 41 as shown in FIG. 8 is derived. Due to the signal from the time delay circuit 42, the gate circuit 43 passes the output of the saturation amplifier 38 $\tau$ sec. after the input pulse is applied to the time delay circuit. In other words, the output signal of the saturation amplifier 38 is applied to the set input terminal of the flip-flop 44 $\tau$ sec. after the input pulse is applied to the time delay circuit, and is stored in the flip-flop 44. The input pulse to the time delay circuit 42 is also applied to the reset input terminal of the flip-flop 44 so that the latter is always reset $\tau$ sec. before the output signal of the saturation amplifier 38 is applied to the set signal input terminal of the flip-flop 44. The period $T_d$ of the Doppler signal is so selected as to satisfy the condition $T_d > \tau$, so that the flip-flop 44 holds the digital output signal of the amplifier 38 when the output pulse of the time delay circuit 42 appears. The digital signals "0" and "1" of the output signal $e_{13}$ of the saturation amplifier 38 are shown in FIG. 8. As is well known in the art, it is possible to detect whether the target is moving toward or away from the distance measuring apparatus by detecting the digital signals of the signals $e_9$, $e_{13}$, and $e_{14}$, shown in FIG. 8, which are out of phase by 90°. That is, the signal $e_9$ shown in FIG. 8 is used as the reference signal. When the target is moving away from the distance measuring apparatus, the signal $e_{13}$ as shown in FIG. 8 is derived while when the target is moving toward the apparatus, the signal $e_{14}$ as shown in FIG. 8 is derived. In summary, the digital signal, which is the output of the flip-flop 44, is "0" when the target is moving away from the distance measuring apparatus and "1" when the target is moving toward the apparatus. The output signal of the flip-flop 44 is applied to one input terminal of the decision circuit 37 and becomes one of the sensor signals of the decision circuit 37.

Unlike in the first embodiment described with reference to FIG. 3, in the second embodiment, the arithmetic mean is not obtained, so that the response can be remarkably increased and it is possible to detect whether the target is moving toward or away from the distance measuring apparatus.

The second embodiment described so far is not directed to the measurement of the stationary target, but it is possible to measure the distance even when the target is stationary, that is when $\cos \omega_c \Delta t = 0$ by, for example, inserting a phase shifter in a transmission system so that the phase of the signal to be transmitted may be varied. This method is well known in the art.

In the second embodiment the output signals of the low-pass filters 28 and 30 have been described as being in the same phase in the instantaneous comparison system, but it should be understood that the distance measurement is also possible with the output signals out of phase by 180°. In the system for detecting whether the target is moving toward or away from the distance measuring apparatus, the Doppler signals out of phase by 90° were used, but it should be understood that these signals were used only for the convenience of processing the signals. Therefore, the Doppler signals out of phase by any angle except 180° may be used.

Both the instantaneous comparison system and the circuit for detecting whether the target is moving toward or away from the distance measuring apparatus are incorporated in the second embodiment, but it should be understood that they may be used individually as needs demand. The instantaneous comparison system is particularly advantageous in that the response is very fast, and the circuit for detecting whether the target is moving toward or away from the distance measuring apparatus may be inserted to any embodiment of the present invention. For example, when it is inserted into the first embodiment which utilizes the arithmetic mean generator, not only the distance to the target may be measured with a higher degree of accuracy but also whether the target is moving toward or away from the distance measuring apparatus may be detected. When the circuit is used for an apparatus for detecting a target moving only in one direction the erroneous operation will be almost completely eliminated.

Figure 9A:
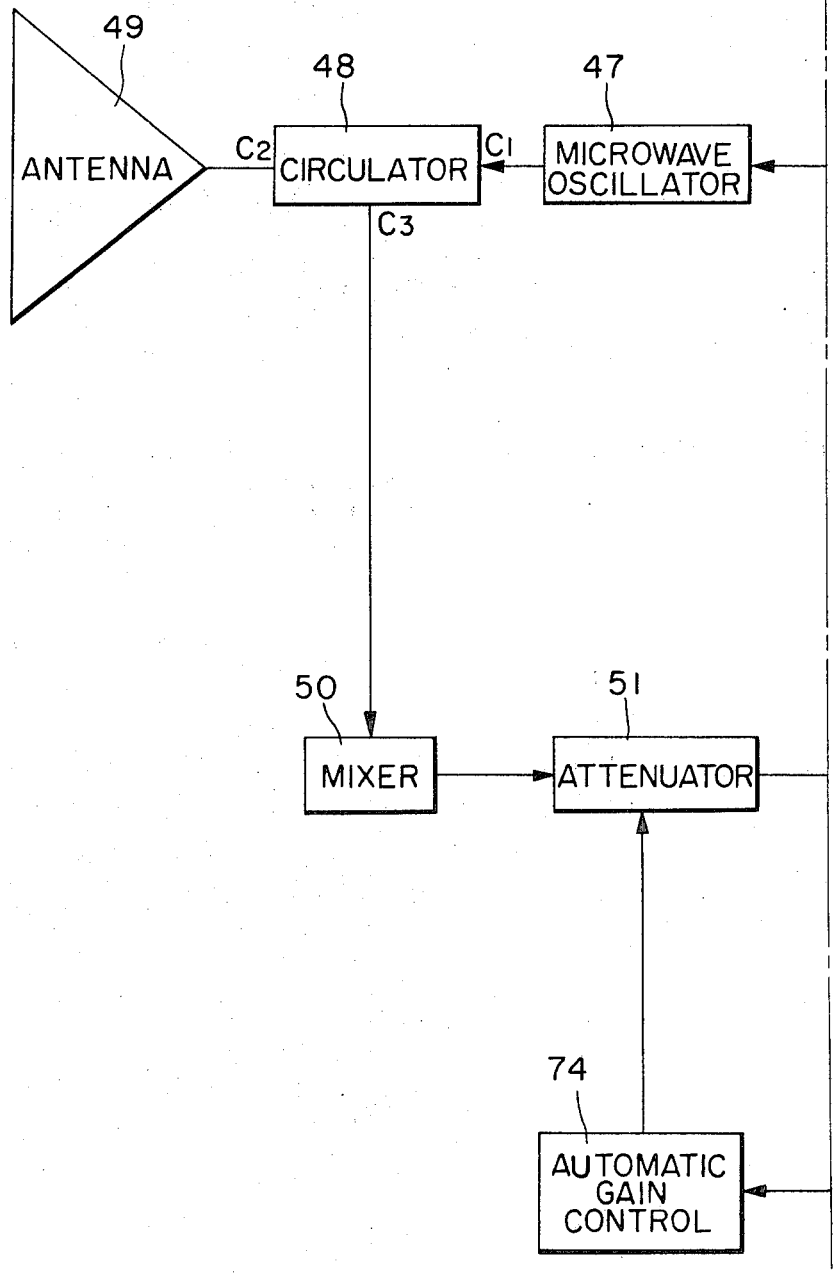
Figure 9B:
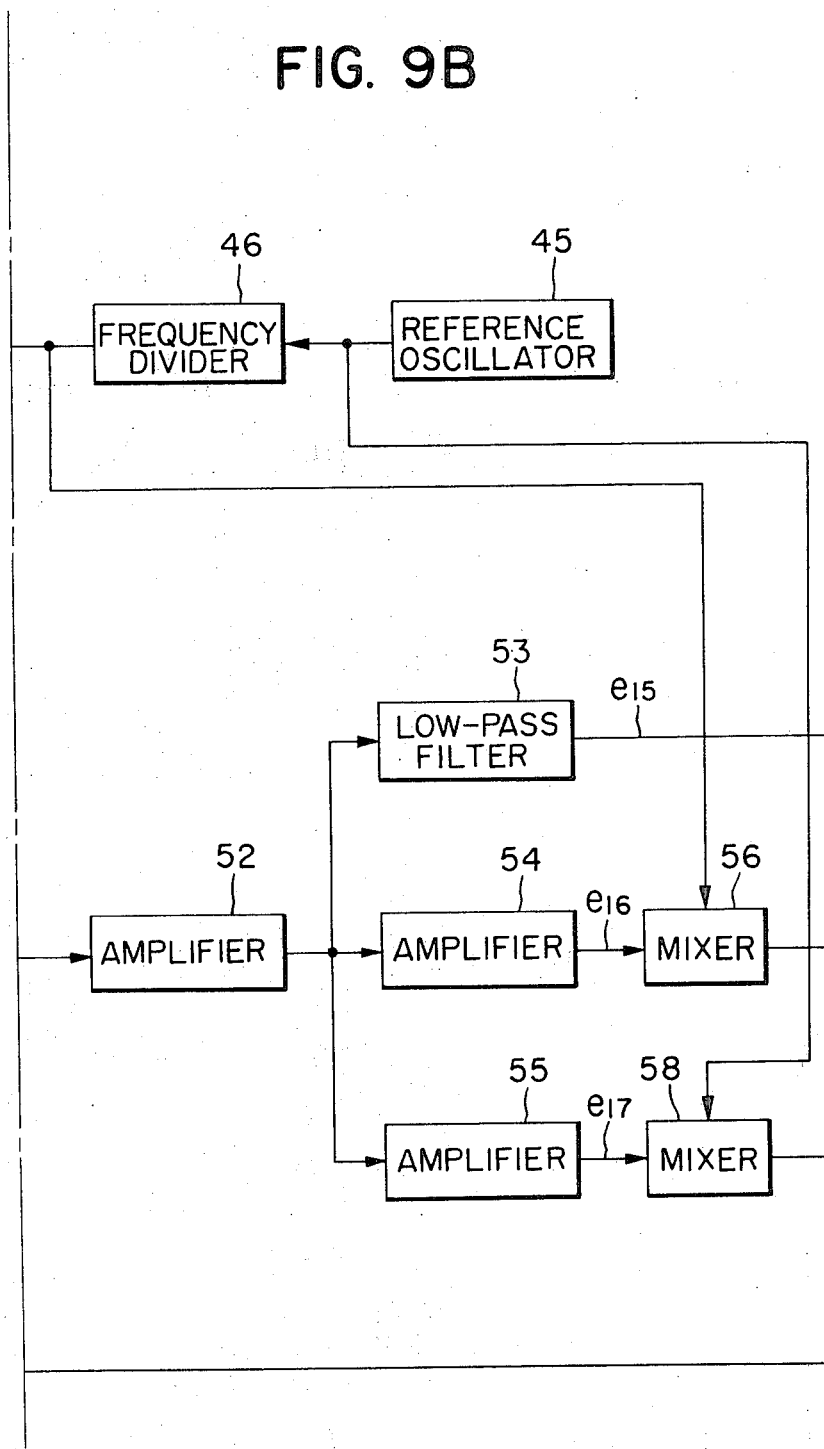
Figure 9C:
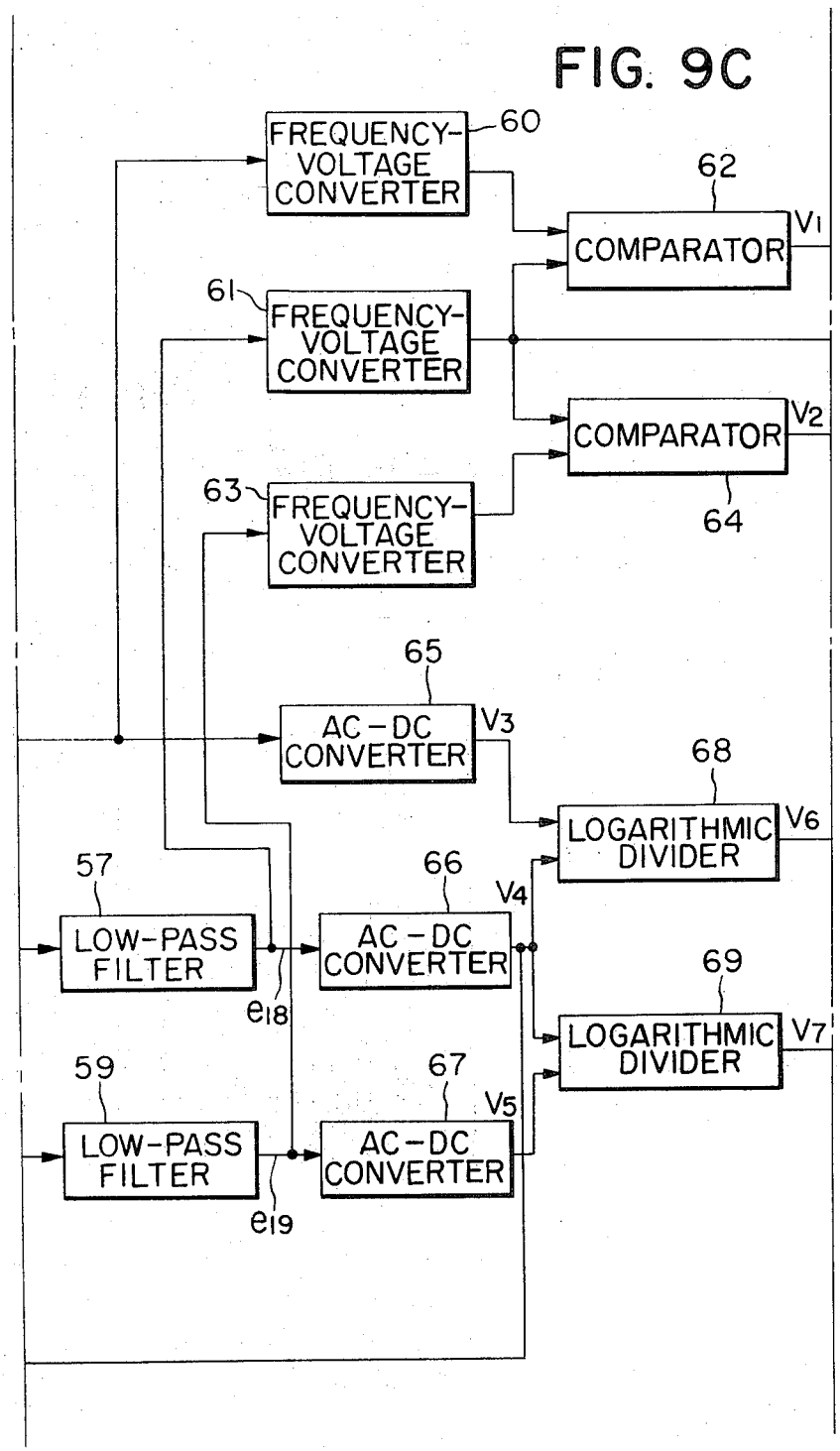

THIRD EMBODIMENT, FIG. 9 and TABLE 1

The third embodiment of the present invention which will be described in detail hereinafter with reference to FIG. 9 and Table 1, is used as a gas bag sensor. That is, the third embodiment may measure both distance and velocity in order to derive the sensor signal for actuating the gas bag for protecting the driver and passengers. The fundamental construction of the third embodiment is substantially similar to that of the first embodiment shown in FIG. 3 so that only the stages different from the first embodiment will be described. A reference oscillator 45 oscillates a frequency two times the FM frequency, and has its output terminal connected to the input terminal of a frequency divider 46 and to one input terminal of a mixer 58 to be described in more detail hereinafter. The output terminal of the frequency divider 46 is connected to the input terminal of a microwave oscillator 47 and to one input terminal of a mixer 56 to be described in more detail hereinafter. The output of the microwave oscillator 47 is connected to a first terminal $c_1$ of a circulator 48, a second terminal $c_2$ of which is connected to an antenna 49 and a third terminal $c_3$ of which is connected to a mixer 50, which mixes the reflected signal or echo received from the antenna 49 with a part of signal leaking from the circulator 48 to produce a low frequency output signal. The output of the mixer 50 is fed into an attenuator 51 which attenuates the input signal automatically in response to the intensity of the received echo. The output terminal of the attenuator 51 is connected to the input terminal of an wide-band amplifier 52, the output terminal of which is connected to the input terminals of a low-pass filter 53, and of band-pass amplifiers 54 and 55. The output terminal of the low-pass filter 53 is connected to the input terminals of an AC-DC converter 65 and of a frequency-voltage converter 60. The output terminal of the amplifier 54 is connected to the other input terminal of the mixer 56, the output terminal of which is connected to a low-pass filter 57. The output terminal of the low-pass filter 57 is connected to the input terminals of an AC-DC converter 66 and of a frequency-voltage converter 61. In like manner, the output terminal of the amplifier 55 is connected to the other input terminal of the mixer 58, the output terminal of which is connected to the input terminal of a low-pass filter 59. The output terminal of the low-pass filter 59 is connected to the input terminals of an AC-DC converter 67 and of a frequency-voltage converter 63. The output terminals of the frequency-voltage converters 60 and 61 are connected to the input terminals of a comparator 62, and the output terminals of the frequency-voltage converters 61 and 63 are connected to the input terminals of a comparator 64. The output terminals of the AC-DC converters 65 and 66 are connected to the input terminals of a logarithmic divider 68, and the output terminals of the AC-DC converters 66 and 67 are connected to the input terminals of a logarithmic divider 69. The output of the logarithmic divider 68 is fed to a first input terminal of an arithmetic mean generator 72 through a distance discriminator 70. In like manner, the output of the logarithmic divider 69 is fed through a distance discriminator 71 to a second input terminal of the arithmetic mean generator 72. The output terminals of the comparators 62 and 64 are connected to third and fourth input terminals of the arithmetic mean generator 72, the output terminal of which is connected to a first input terminal of a decision circuit 73, a second input terminal of which is connected to the output terminal of the frequency-voltage converter 61. The output terminal of the AC-DC converter 66 is also connected to the input terminal of an automatic gain control 74 which is connected to the attenuator 51 for electronically controlling it.

Next the mode of operation will be described. The output of the reference oscillator 45 is a sine wave with a frequency $2f_m$, which is divided by the frequency divider 46 into a sine wave frequency $f_m$ and is fed into the microwave oscillator 47. The FM signal is transmitted through the circulator 48 from the antenna 49. The microwave oscillator 47 comprises a solid-type microwave oscillator. The circulator 48 is connected to the antenna 49, the mixer 50 and the microwave oscillator 47 in such a manner that the signal may be transmitted from the microwave oscillator 47 to the antenna without being attenuated, and the echo received by the antenna 49 may be fed into the mixer 50 without being attenuated. The circulator 48 is adapted to feed a part of the signal from the microwave oscillator 47 (about −20 db) into the mixer 50. This signal is mixed with the echo received from the antenna 49 so that the low frequency signal is derived from the output terminal of the mixer 50. The output signal from the mixer 50 is fed into the amplifier 52 through the attenuator 51. The automatic gain controller 74 compares the output signal from the AC-DC converter 66 with a reference signal or voltage so that the output signal from the mixer 50 may be attenuated in response to the control signal derived from the automatic gain control 74. More particularly, the higher the output voltage from the AC-DC converter 66, the more the output signal from the mixer 50 is attenuated by the attenuator 51, and vice versa. Therefore, the variation in the output signals of the AC-DC converters 65, 66 and 67 may be minimized even when the output signal of the mixer 50 varies.

The low-pass filter 53, the band-pass amplifiers 54 and 55, the mixers 56 and 58, and the low-pass filters 57 and 59 are similar in construction and operation to the corresponding components 14, 15, 18, 16, 19, 17 and 20, respectively, of the first embodiment shown in FIG. 3 so that no further description will be made.

The signal waveforms $e_{15} - e_{19}$ shown in FIG. 9 are similar to those $e_0 - e_4$, respectively shown in FIG. 4. Since the target has a non-zero relative velocity in the third embodiment, the output waveforms $e_{15}$, $e_{18}$ and $e_{19}$ of the low-pass filters 53, 57 and 59 are of the low frequency waveforms containing only the Doppler signal components as in the case of the waveforms $e_0$, $e_3$ and $e_4$ shown in FIG. 4.

The output signal of the frequency-voltage converter 60 is the voltage in proportion to the frequency of the input signal to the frequency-voltage converter 60, that is the frequency of the output signal of the low-pass filter 53. Since the frequency of the Doppler signal is in proportion to the relative velocity $u$ of the moving target, the output voltages of the frequency-voltage converter 60 is in proportion to the relative velocity $u$. In like manner, the output voltage of the frequency-voltage converters 61 and 63 are in proportion to the relative velocity $u$. The two output voltages from the frequency-voltage converters 60 and 61 are compared with each other in the comparator 62 so that when the difference between the two output signals is higher than a predetermined level, the output $V_1$ of the comparator 62 is "1," while when the difference is lower than the predetermined level, the output $V_1$ is "0." In like manner, the output voltages of the frequency-voltage converters 61 and 63 are compared in the comparator 64 and the output $V_2$ of the comparator 64 is "1" or "0" depending upon whether the difference in output signals of the frequency-voltage converters 61 and 63 is higher or lower than a predetermined level. Thus, whether the differences between each two of the Doppler signals from the low-pass filters 53, 57 and 59 are within predetermined values or not is detected in terms of the output signals $V_1$ and $V_2$ of the comparators 62 and 64.

The AC-DC converter 65 converts the AC output signal of the low-pass filter 53 into the DC voltage. That is, the output $V_3$ of the AC-DC converter 65 is the voltage in proportion to $rJ_0 (m_r)$ as seen from Eq. (1). In like manner, the output $V_4$ of the AC-DC converter 66 is the output voltage in proportion to $rJ_1 (m_r)$, and the output $V_5$ of the AC-DC converter 67 is in proportion to $rJ_2 (m_r)$. In the logarithmic divider 68, the logarithm of $V_4/V_3$, that is $J_1 (m_r)/J_0 (m_r)$ is obtained. In like manner, in the logarithmic divider 69, the logarithm of $J_2 (m_r)/J_1 (m_r)$ is obtained. Thus, the output voltages $V_6$ and $V_7$ of the logarithmic dividers 68 and 69 are in proportion to log $(J_1 (m_r)/J_0 (m_r))$ and log $(J_2 (m_r)/J_1 (m_r))$, respectively.

Figure 3C:
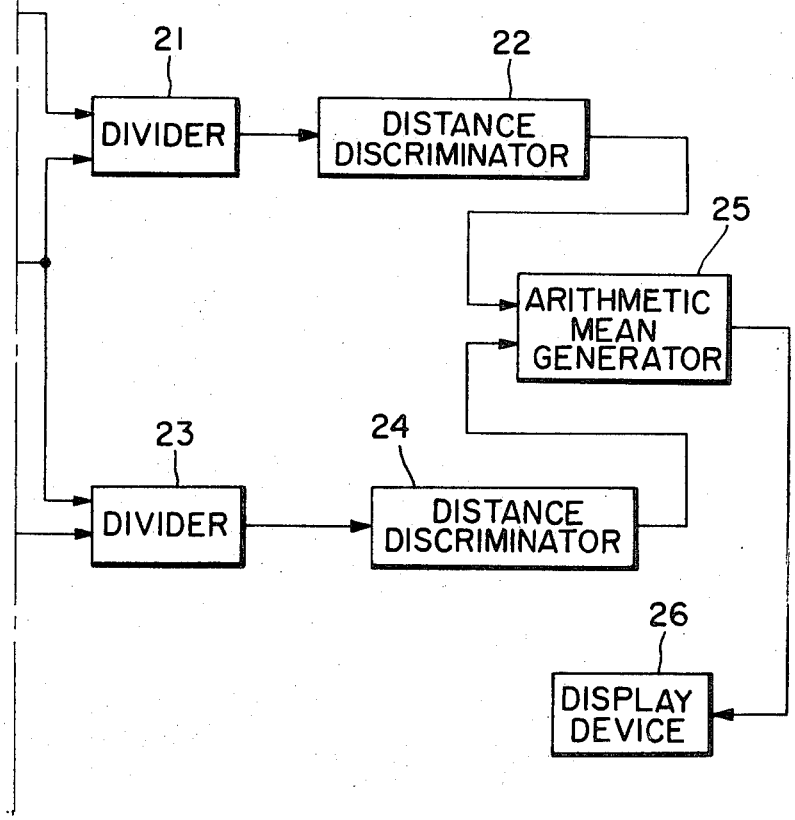

The distance discriminators 70 and 71 are similar in operation to those 22 and 24 shown in FIG. 3 so that the outputs $V_8$ and $V_9$ of the distance discriminators 70 and 71 are in proportion to the distance to the target. The arithmetic mean generator 72 is so arranged that its output $V_{10}$ may have one of the values shown in Table 1 in response to the outputs $V_1$ and $V_2$ of the comparators 62 and 64. That is, the arithmetic mean generator 72 outputs the signal representative of the distance to the target only when the difference between at least two of the Doppler signals from the low-pass filters 53, 57 and 59 is lower than a predetermined value. When the difference between two of the Doppler signals from the low-pass filters 53, 57 and 59 is lower than predetermined values, the arithmetic mean generator 72 outputs an arithmetic mean of the two distances measured independently.

As is clear from FIG. 2, when $m_r$ is small, that is the distance to the target is closer, $J_2 (m_r)$ is extremely small as compared with $J_0 (m_r)$ and $J_1 (m_r)$ so that the distance to the target given by the output $V_8$ is more reliable than given by the output $V_9$. When $m_r$ is large, the distance to the target given by $V_9$ is more reliable than given by the $V_8$. However, since the magnitudes of $J_0 (m_r)$, $J_1 (m_r)$ and $J_2 (m_r)$ are determined from the disturbances of the Doppler signals derived from the low-pass filters 53, 57 and 59, the output signal $V_{10}$ representative of the distance to the target is the most reliable.

The decision circuit 73 is so arranged that the gas bag actuating signal is derived only when the relative velocity is in excess of a predetermined velocity, and at the same time when the quotient obtained by dividing the output voltage derived from the frequency-voltage converter 61 by $V_{10}$ is in excess of a predetermined value and $V_{10}$ is not zero. Thus, only when the vehicle is going to collide, the gas bag is inflated.

In the third embodiment, DC signals obtained by converting the Doppler signals are used to calculate the ratio in intensity as an example of calculating the ratio in intensity on a time average.

In this embodiment, the target 1 to 3 meters from the vehicle was measured with the accuracy ± 20 percent when $\Delta f = 10$ MHz. In the prior art system, the fixed error $\Delta R$ is of the order of 4 meters so that the target at an extremely short distance from the vehicle cannot be measured with a desired accuracy. As a result, the prior art system is not adapted to be used as a gas bag sensor. However, the radar or distance measuring apparatus in accordance with the present invention exhibits the excellent characteristics desired for the gas bag sensor. That is, the distance measuring apparatus in accordance with the present invention can measure both distance to the target even at a short distance and the velocity thereof with a greater degree of accuracy so that it may be used as a gas bag sensor which is highly reliable and dependable in operation.

It will be understood that when the circuit for detecting whether the target is moving toward or away from the distance measuring apparatus or vehicle is added to the third embodiment, the gas bag may be inflated only when the target is moving toward the vehicle. Therefore, the inadvertent operation of the gas bag such as the inflation of the gas bag when the vehicle with the gas bag sensor of the present invention is passed by a vehicle or when an obstacle such as a vehicle is moving crosswise, can be prevented. Thus, the reliability of the gas sensor may be much improved.

As described hereinbefore, according to the present invention, the distance to the target is measured from the ratios in intensity between Doppler signals, not from the direct detection of the frequency of the output signal of the mixer, so that the distance measuring apparatus of the present invention has no fixed error at all and there is no limit for minimum measurable distance to the target in principle. In the prior art system the error is increased unless $\Delta t >> 2\pi/\omega_m$, but according to the system of the present invention the limit imposed upon $\omega_m$ may be relaxed by changing the characteristics of the distance discriminators. The present invention is based upon the amplitude comparison system so that the measurement of the distance to the target will not be adversely affected by the variation in intensity of the echo. Furthermore, the Doppler signals are detected independently in measuring both the relative velocity of and the distance to the target and compared with each other so that relative velocity may be measured with a higher degree of accuracy. Furthermore, as is clear from the characteristics (See FIGS. 5 and 6) of the distance discriminators 22 and 24, even the shorter distance can be measured with the higher degree of accuracy. This is one of the most important advantages of the present invention in practice. In the embodiments of the present invention described above, the harmonics up to the second harmonics are used, but it will be understood that the higher harmonics may be also utilized in a manner substantially similar to that described above so that the measurement of the relative velocity of and the distance to the target may be made with a still higher degree of accuracy.

What is claimed is:

1. A method for measuring distance to a target utilizing transmitted and reflected frequency-modulated continuous waves comprising mixing a transmitted wave and a reflected wave so as to derive a low frequency wave, separating a Doppler signal from said low frequency wave, separating a fundamental wave component and harmonic components from said low frequency wave and separating Doppler signals therefrom, calculating the ratio in intensity between at least two of said separated Doppler signals on a time average, and determining the distance to said target from said calculated ratio.

2. A distance measuring method as set forth in claim 1, further comprising detecting a direction of a relative movement of the target with respect to said distance measuring apparatus.

3. A distance measuring method as set forth in claim 1, further comprising detecting a frequency of at least one of the Doppler signals for measuring the relative velocity of the target with respect to said distance measuring apparatus.

4. A method for measuring distance to a target utilizing transmitted and reflected frequency-modulated continuous waves comprising mixing a transmitted wave and a reflected wave so as to derive a low frequency wave, separating a fundamental wave component and harmonic components from said low frequency wave and separating Doppler signals therefrom, calculating the ratio in intensity between at least two of said separated Doppler signals on a time average, and determining the distance to said target from said calculated ratio.

5. In an apparatus for measuring distance to a target of the type including means transmitting frequency modulated continuous waves to the target and receiving waves reflected from the target, the improvement comprising means for mixing a transmitted wave and a reflected wave so as to derive a low frequency wave, means for separating a Doppler signal from a low frequency wave obtained by mixing said transmitted and reflected waves, means for separating a fundamental wave component and harmonic components from said low frequency wave and separating Doppler signals therefrom, means for calculating the ratio in intensity between at least two of said separated Doppler signals on a time average, and means for measuring the distance to a target from said calculated ratio.

6. A distance measuring apparatus as set forth in claim 5 further comprising means for detecting a direction of a relative movement of the target with respect to said distance measuring apparatus.

7. A distance measuring apparatus as set forth in claim 5 further comprising means for detecting a frequency of at least one of the Doppler signals for measuring the relative velocity of the target with respect to said distance measuring apparatus.

8. A distance measuring apparatus as set forth in claim 6 further comprising means for detecting a frequency of at least one of the Doppler signals for measuring the relative velocity of the target with respect to said distance measuring apparatus.

9. A distance measuring apparatus as set forth in claim 6 wherein said means for detecting a direction of a relative movement of the target with respect to said distance measuring apparatus comprises a first low-pass filter for deriving one of said Doppler signals, a first saturation amplifier for shaping the output wave of the first low-pass filter into a rectangular wave, a second low-pass filter for deriving another Doppler signal, a second saturation amplifier for shaping the output wave of said second low-pass filter into a rectangular wave, a differentiation circuit for differentiating the output wave of said second saturation amplifier, a diode for passing only one polarity component of said differentiated wave, a time delay circuit for delaying said differentiated wave, a gate circuit connected to pass the output of said first saturation amplifier when the level of the output signal from the time delay circuit is in excess of a predetermined level, and an RS flip-flop connected to be set in response to the output of said gate, and reset in response to the output of said diode, whereby said RS flip-flop produces an output signal when the target is moving toward said distance measuring apparatus.

10. A distance measuring apparatus as set forth in claim 5, wherein said means for mixing said transmitted and reflected waves so as to derive a low frequency wave comprises an antenna, a circulator, a solid-type microwave oscillator connected to apply oscillations to said antenna by way of said circulator, a mixer connected to said circulator and an attenuator and a wide-band amplifier connected to receive signals from said mixer.

11. A distance measuring apparatus of claim 10 wherein said means for separating said low frequency wave and for deriving said Doppler signals comprises first and second band-pass amplifiers connected to said wide-band amplifier, the first and second mixers connected respectively to the outputs of said first and second band-pass amplifiers, a source of reference oscillations connected to said first mixers, a frequency divider connected to said reference oscillator for applying frequency desired oscillations to said second mixer, first and second low-pass filters connected to the outputs of said first and second mixers respectively for providing first and second Doppler signals, third low-pass filter means connected to said wide-band amplifier for providing a third Doppler signal, and automatic gain control means for controlling the gain of said wide-band amplifier.

12. The distance measuring apparatus of claim 11 wherein said means for calculating the ratio intensity comprises first and second logarithmic dividers, and AC to DC converting means for selectively applying the outputs of said low-pass filters to said logarithmic dividers.

13. The distance measuring apparatus of claim 12 wherein said means for measuring the distance to said target comprises first and second distance disciminators connected to the outputs of said logarithmic dividers and arithmetic mean generator means connected to the outputs of said distance discriminators.

14. The distance measuring apparatus of claim 7 wherein said means for detecting a frequency of at least one of the Doppler signals comprises first, second and third frequency to voltage converting means connected to receive three separate Doppler signals, and a pair of comparitor means connected to receive separate pairs of outputs of said frequency to voltage converting means.

15. A distance measuring apparatus as set forth in claim 7, wherein said means for mixing said transmitted and reflected waves so as to derive a low frequency wave comprises an antenna, a circulator, a solid-type microwave oscillator connected to apply oscillations to said antenna by way of said circulator, a mixer connected to said circulator and an attenuator and a wide-band amplifier connected to receive signals from said mixer.

16. A distance measuring apparatus of claim 14 wherein said means for separating said low frequency wave and for deriving said Doppler signals comprises first and second band-pass amplifiers connected to said wide-band amplifier, the first and second mixers connected respectively to the outputs of said first and second band-pass amplifiers, a source of reference oscillations connected to said first mixers, a frequency divider connected to said reference oscillator for applying frequency desired oscillations to said second mixer, first and second low-pass filters connected to the outputs of said first and second mixers respectively for providing first and second Doppler signals, third low-pass filter means connected to said wide-band amplifier for providing a third Doppler signal, and automatic gain control means for controlling the gain of said wide-band amplifier.

17. The distance measuring apparatus of claim 16 wherein said means for calculating the ratio intensity comprises first and second logarithmic dividers, and AC to DC converting means for selectively applying the outputs of said low-pass filters to said logarithmic dividers.

18. The distance measuring apparatus of claim 17 wherein said means for measuring the distance to said target comprises first and second distance discriminators connected to the outputs of said logarithmic dividers and arithmetic mean generator means connected to the outputs of said distance discriminators.

19. The distance measuring apparatus of claim 18 wherein said means for detecting a frequency of at least one of the Doppler signals comprises first, second and third frequency to voltage converters connected respectively to the outputs of said first, second and third low-pass filters, and first and second comparitors connected to receive the outputs of separate pairs of said frequency to voltage converters, said apparatus further comprising a decision circuit connected to said arithmetic means generator means, and means applying the output of one of said converters to said decision circuit.

20. In an apparatus for measuring distance to a target of the type including means transmitting frequency modulative continuous waves to the target and receiving waves reflected from the target, the improvement comprising
means for mixing a transmitted wave and a reflected wave so as to derive a low frequency wave,
means for separating a fundamental wave component and harmonic component from said low frequency wave and separating Doppler signals therefrom,
means for calculating the ratio intensity between at least two of said Doppler signals on a time average basis, and
means for determining the distance to said target from said calculator ratio.

21. A distance measuring apparatus as set forth in claim 8 wherein said means for detecting a direction of a relative movement of the target with respect to said distance measuring apparatus comprises, a first low-pass filter for deriving one of said Doppler signals, a first saturation amplifier for shaping the output wave of the first low-pass filter into a rectangular wave, a second low-pass filter for deriving another Doppler signal, a second saturation amplifier for shaping the output wave of said second low-pass filter into a rectangular wave, a differentiation circuit for differentiating the output wave of said second saturation amplifier, a diode for passing only the positive component of said differentiated wave, a time delay circuit for delaying in time said positive differentiated wave, a gate circuit for passing the output signal of said first saturation amplifier when the level of the output signal from the time delay circuit is in excess of a predetermined level, and a RS flip-flop connected to be set in response to the output of said gate, and reset in response to the output of said diode, and provides an output signal when the target is moving toward said distance measuring apparatus, and said means for detecting a frequency of at least one of the Doppler signals comprises three frequency-voltage converters and two comparators.

* * * * *